(12) United States Patent
Christiansen

(10) Patent No.: US 6,773,601 B2
(45) Date of Patent: Aug. 10, 2004

(54) METHOD FOR THE REMOVAL OF PARTICULATE MATTER FROM AQUEOUS SUSPENSION

(75) Inventor: Niels Christiansen, Gentofte (DK)

(73) Assignee: Haldor Topsoe A/S, Lyngby (DK)

( * ) Notice: Subject to any disclaimer, the term of this patent is extended or adjusted under 35 U.S.C. 154(b) by 156 days.

(21) Appl. No.: 09/935,804

(22) Filed: Aug. 23, 2001

(65) Prior Publication Data
US 2002/0053543 A1 May 9, 2002

(30) Foreign Application Priority Data

Sep. 1, 2000 (DK) .......................................... 2000 01292

(51) Int. Cl.⁷ .............................................. B01D 61/00
(52) U.S. Cl. ........................ 210/651; 210/650; 210/639; 210/321.6; 210/195.2; 210/500.25; 210/654; 426/490; 426/422; 426/330.4
(58) Field of Search ................................ 210/650, 651, 210/654, 321.6, 195.2, 500.25, 500.26; 422/490, 422, 330.4

(56) References Cited

U.S. PATENT DOCUMENTS

| | | | |
|---|---|---|---|
| 4,562,021 A | 12/1985 | Alary et al. .................. 264/43 |
| 4,698,157 A | 10/1987 | Gillot ......................... 210/496 |
| 4,781,831 A | * 11/1988 | Goldsmith | |
| 4,888,115 A | 12/1989 | Marinaccio et al. ........ 210/636 |
| 4,943,374 A | * 7/1990 | Heininger et al. | |
| 4,946,592 A | 8/1990 | Galaj et al. ................. 210/490 |
| 5,009,781 A | * 4/1991 | Goldsmith | |
| 5,108,601 A | * 4/1992 | Goldsmith | |
| 5,114,581 A | * 5/1992 | Goldsmith et al. | |
| 5,221,479 A | * 6/1993 | Etoh et al. | |
| 5,560,828 A | * 10/1996 | Wenten et al. | |
| 5,879,557 A | * 3/1999 | Strohm et al. | |
| 6,126,833 A | * 10/2000 | Stobbe et al. | |
| 6,139,724 A | * 10/2000 | Strohm et al. | |

FOREIGN PATENT DOCUMENTS

| | | |
|---|---|---|
| EP | 645174 | 3/1995 |
| GB | 2176715 | 1/1987 |
| JP | 58101718 | 6/1983 |

OTHER PUBLICATIONS

K.J. Burrell and R.J.R. Reed, *Crossflow Microfiltration of Beer: Laboratory-scale Studies on the Effect of Pore Size*, Jun. 1994, pp. 399–404.

Q. Gan, et al., *Beer Clarificaticion by Cross-flow Microfilration: Fouling Mechanisms and Flux Enhancement*, Trans IchemE. vol. 75, Part A, Jan. 1997, pp. 3–8.

* cited by examiner

Primary Examiner—Ana Fortuna
(74) Attorney, Agent, or Firm—Dickstein Shapiro Morin & Oshinsky, LLP

(57) ABSTRACT

Method for the removal of particulate matter from aqueous suspension comprising steps of establishing value of pH and of Zeta potential of particles in the suspension; providing a porous filter having a membrane layer consisting of at least a metal-oxide with a Zeta potential at the pH value of the suspension having same polarity of the Zeta potential as the particles in the suspension; passing the suspension through the porous filter; and withdrawing a filtrate.

15 Claims, 2 Drawing Sheets

METHOD FOR THE REMOVAL OF PARTICULATE MATTER FROM AQUEOUS SUSPENSION

Figure 1:
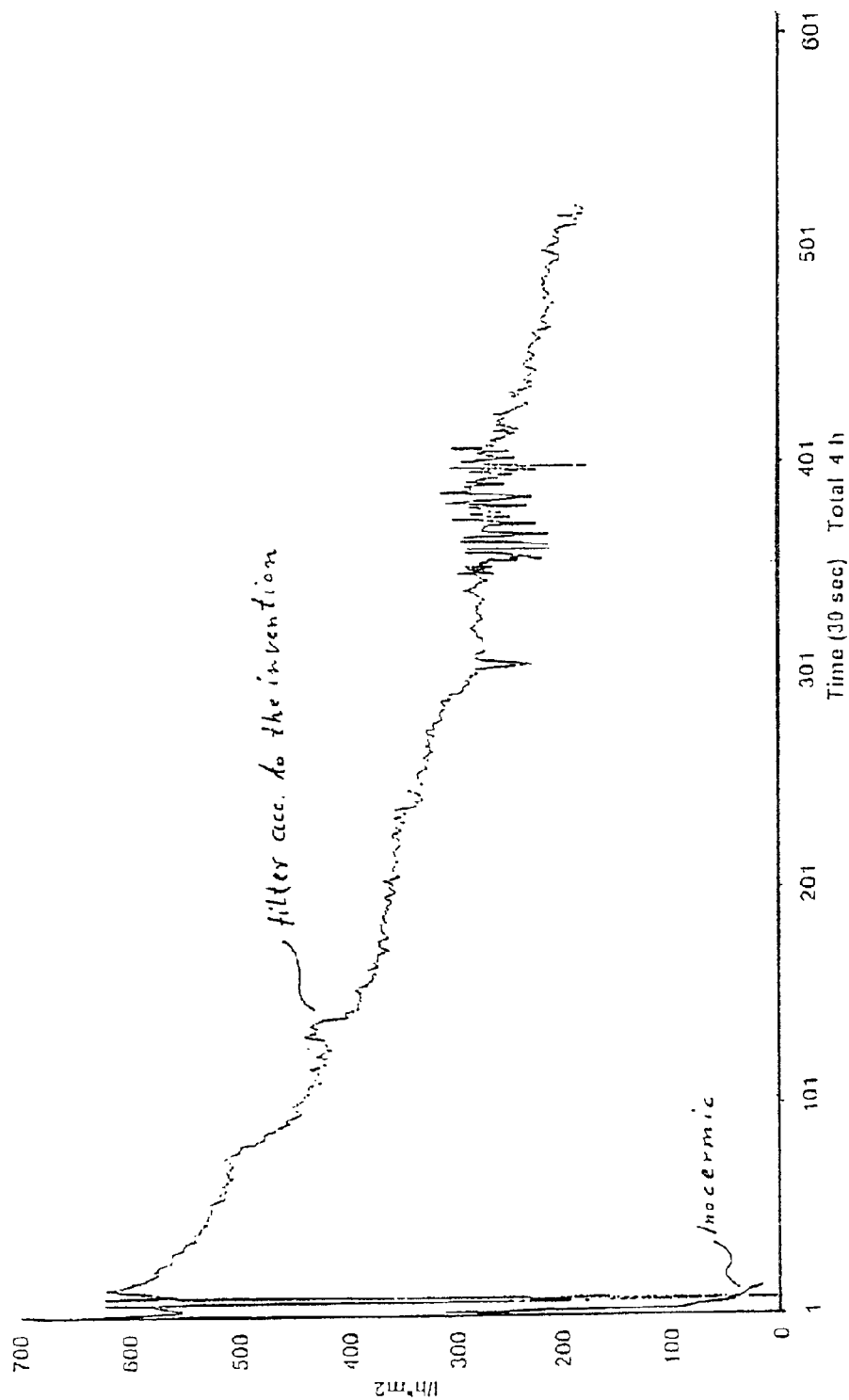

The present invention is directed to removal of particulate matter from aqueous suspensions. In particular the invention concerns filtration of aqueous suspensions by means of ceramic membranes in cross flow operation.

A filter according to U.S. Pat. No. 4,946,592 coated with a yttrified zirconia film having a pore size of 5 µm can provide a flow of approximately 600 l/hm² for up 10 hours. The identity of the liquid was not specified. Another filter with a zirconia film having a pore size of 0.2 µm provided a flow of the non-specified liquid approximately 140 600 l/h/m² for up to 5 hours.

U.S. Pat. No. 4,698,157 concerns a filter membrane for filtering liquid e.g. foodstuffs and a method for preparing said filter. The method comprises the steps of preparing a deflocculated slip of a metal oxide comprising a dispersing agent and thickening agent.

The slip is poured into the tube. The tube is dried and subsequently calcined. The resulting filter membrane comprises a macroporous tube with a pore of 10–20 µm, an additional layer inside of tube with a pore size of 1–3 µm, and finally a filter (membrane) layer, which is 10 to 20 µm thick and has a pore size of 0.2 to 0.8 µm. The only filter layer exemplified in the disclosure is an alumina membrane calcined at 1300° C. The membrane layer is characterised by an average roughness, which over a distance of five times the average grain size is less than one fifth of the average grain size.

U.S. Pat. No. 4,562,021 mentions two methods for preparing a medium for microfiltration. The first method comprises the step of preparing a slip made from e.g. $TiO_2$, nitric acid, polyvinyl alcohol and an optional wetting agent. The slip is mixed and homogenised and thereafter filled into a porous ceramic tube. It is dried at 20° C. for 24 hours and baked stepwise, e.g. up to 1200° C.

According to the second method titanium-ethoxide is dissolved in an alcohol together with a gelling agent. The slip is filled into the tube for one to several minutes. The tube is dried in a humid atmosphere, whereby the titanium ethoxide is hydrolysed into $Ti(OH)_4$. The tube is then calcined at 100° C. to 1000° C., whereby the hydroxide is decomposed into the oxide. The resulting microfiltration medium comprises an outer porous ceramic tube and an inner membrane of $TiO_2$ with pore size ranges from 58 to 1100 Å and provide a water flow up to 5 l/h/m².

EP Patent No. 645,174 A1 discloses a method for filtration of beer using an asymmetric ceramic membrane. Without any back-flush the flow rate decreased from 150 to 3 l/h/m² within 2 hours and from 150 to 70 l/h/m² with back-flush.

GB Patent No. 2,176,715 also discloses a method for cross-flow filtration of beer but without using back flush.

Q. Gan et al (Trans 1 ChemE, Vol 75, Part A, January 1997 pp. 3–8) have investigated beer clarification by cross-flow microfiltration using tubular ceramic membranes composed of alumina with 0.2, 0.5 and 1.3 µm nominal pore diameters. Operating this type of membrane with raw beer a maximum average membrane flux of 22 kg/m²/h was obtained provided that suitable back-flush frequency and strength with regard to the base flux level was used.

Cross-flow microfiltration may be an economical replacement for kieselguhr filters. Burell & Ried (Filtration & Separation June 1994, pp. 399–405) also found that 0.5 µm ceramic cross flow microfiltration membranes impart a high degree of both clarity and micro-organism removal to the filtrate. They obtained an average membrane flux of up to 53 l/m²/h for 5 hour filtration periods falling to 35 l/m²/h after 15 hours.

JP 58 101 718 discloses filtration of a suspension with particles of two sizes, where the bigger particles are to be removed by a filter of synthetic polymer material. The smaller particles are positively charged and the filter is applied a material, which makes the surface positive and the smaller particles passing through the filter are repelled from the filter and clogging is prevented.

U.S. Pat. No. 4,888,115 discloses filtration, where the polarity of the Zeta potential of the particles in a suspension and the filter surface is made to be the same to prevent clogging of the filter. The filter is an organic polymeric membrane with a charge modifying agent bound to the membrane microstructure, chosen to obtain the required polarity.

The general object of this invention is to provide a method and membrane with high and stable average permeate flux of aqueous suspensions with inorganic and organic particles. Aqueous suspensions of the above type are typically in food and beverage processing including clarification of wine and beer. In filtration of wine and beer yeast cells, cell de-bries and larger proterinaceous compounds are a particular problem, and extensive deposition of proteins, carbohydrates and minerals on the filter material largely influence product qualities. In beer clarification processes a most usually employed filter aid is kieselguhr. The disadvantage of kieselguhr is frequent regeneration and disposal of used spent kieselguhr.

Use of ceramic filters in filtration of beer is known in the art and discussed herein before. The known ceramic filters consist typically of sintered metal and micro-oporus glass and are operated with cross-flow. Those filters are not compressible and may be exposed to aggressive chemical environments. However, the known ceramic filters are limited by low permanent flux and by essential quality component retention. Both phenomena arise from severe filter membrane fouling which involves progressive pore flooding, in depth is adsorption/deposition, concentration polarisation and filtration layer formation.

Irreversible fouling of the ceramic membrane is a major problem in filtration and clarification of aqueous suspensions with particulate matter having high affinity to the ceramic material employed in the filter membrane.

It has been found that when adjusting the Zeta partical of a filter membrane layer to the same sign of polarity of particles to be filtered, fouling of the membranes is completely reversible and the membranes show high permeate flux at long time operation.

Periodically back-flushing is an effective method to control reversible fouling and ensures a maximum available membrane surface and high flux rates.

Pursuant to the above findings and observations, this invention provides a method for the removal of particulate matter from aqueous suspension comprising steps of establishing value of pH and of Zeta potential of particles in the suspension;

providing a porous ceramic filter having a membrane layer consisting of at least a metal-oxide with a Zeta potential at the pH value of the suspension having same polarity of the Zeta potential as the particles in the suspension passing the suspension through the porous filter and withdrawing a filtrate.

Zeta potential defines the electrical charge on particles surface in aqueous suspensions. The excess charge at the steam surface of a double layer surrounding the particles in aqueous suspension is measured with a Zeta potential meter by means of known electro-foresis, electro-osmosis and flow of sedimentation potential measurements.

Depending on the suspended particles surface properties, many aqueous suspensions exhibit correlations between system variable and Zeta potential. An important variable is pH value of the aqueous suspension. Thus, to operate the invention in proper manner, it will be necessary to monitor pH value of the suspension to be filtered and optionally to adjust the pH of the suspension to a value at which the desired Zeta potential is obtained. At a Zeta potential with the same signs as the surface of the filtering membrane depth ad adhesion of particles is substantially reduced through repulsion forces. Owing repulsion and weakened adhesion in the pore surface of the filtering membrane fouling of the membrane is substantially reversed through back-flush of the membrane with recovered permeate.

Typically the membranes will be operated in cross-flow manner. Collected particulate matter is thereby continuously removed in tangential flow to the membrane surface. The driving force in cross-flow filtration is either gravity or pressure of the suspension flowing through the membrane. Membrane employed in filtration of colloidal solutions and suspensions have typically a pore size of between 0.3 and 20 micrometers. The desired pore size and pore size distribution is obtained by proper selection of the appropriate starting material and preparation process in accordance with known principals in membrane preparation.

Procedures for producing membranes of fine oxide powder, being useful in the inventive method include calcination of oxidic fine powders, deposition of a suspension of the calcined powder on a substrate and finally calcination of the thus prepared supported membrane. Selection of starting materials for the preparation of the calcined powder material depends on the pH value and on the sign of polarity of the Zeta potential in the aqueous suspension to be subjected to filtration. The most suitable materials are oxides of Al, Ti, Zr, Si and W together with magnesium-aluminum spinel with different crystal structures. Those oxides have a Zeta potential at different pH values as summarised in Table 1 below:

TABLE 1

| pH of the aqueous suspension | Zeta potential of particles with positive polarity | Zeta potential of particles with negative polarity |
| --- | --- | --- |
| 3–4 | $TiO_2$ (anatase) | $TiO_2$ (rutil), $WO_3$ |
| 4–5 | $TiO_2$ (anatase), $ZrO_2$, $Al_2O_3$ | $TiO_2$ (rutil), $WO_3$, $SiO_2$ |
| 5–6 | $ZrO_2$, $Al_2O_3$, $MgAl_2O_4$ | $TiO_2$ (rutil), $WO_3$ |
| 6–7 | $ZrO_2$, $Al_2O_3$, $MgAl_2O_4$ | $TiO_2$ (anatase) |
| 7–8 | $ZrO_2$, $MgAl_2O_4$ | $TiO_2$ (anatase) |
| 8–9 | $MgAl_2O_4$ | |
| 9–10 | $MgAl_2O_4$ (400° C.) | |

To obtain uniform and pure particles, the selected oxidic powder is calcined. Different atom structures or crystal phases obtained in some of the oxidic powders are determined by the calcination temperature.

By calcining titania prior to casting of the membrane it is ensured that all the metal oxide is in the most stable form. Thereby very uniform and stable particles are obtained. Furthermore, the particles have a monodispers grain size distribution.

Calcination of the $MeO_n$ particles prior to slip casting in combination with repeated slip casting of the membrane provides a high uniformity of the pore size distribution in the final membrane filter.

Membrane tubes made of unsupported $TiO_2$ have low tendency to filter clogging, in particular when filtering beer.

Filters made as ceramic filters applied with calcinated metal oxide membranes have a high mechanical and thermal stability and are especially useful in food and beverage industry as they can be sterilised at high temperatures. Furthermore, an additional degree of freedom in choice of membrane material is obtained due to the relationship of this invention between the polarity of the metal oxides and pH in the suspension.

FIGURES

FIG. 1. Comparison of prior art filter with filter according to the invention in beer filtration without back-flush; and FIG. 2. Comparison of prior art filter with filter according to the invention in beer filtration with back-flush.

DETAILED DESCRIPTION OF THE INVENTION

EXAMPLES

Example 1

Preparation of a Filter According to the Invention.

Preparation of a Slip Solution:

Titania ($TiO_2$) was calcined for 2 hours at 900° C.–1100° C. to be transformed into rutil Ti, mixed with water and dispersed followed by grinding in a ball mill to a grain size of about 2 $\mu$m.

Support Tube:

Alumina and methylcellulose were mixed with water and extruded to tubular bodies. The tubes were dried and calcined for one hour at 1500° C. and subsequently at 1600° C. for one hour. Pore size of the thus prepared support tubes was between 1 and 10 $\mu$m.

Deposition of the above prepared slip solution on the support tube involved the following steps:

The tube was filled with a slip solution with 10% by volume of the above prepared $TiO_2$ for 1 min. and drained.

The thus coated tube was calcined at 1115° C. for 7 hours.

The above steps were repeated two times until a final membrane tube having a pore size about 0.5 $\mu$m was obtained.

Example 2

Filtration of Raw Beer According to the Invention.

For the clarification of raw beer a membrane tube as prepared in Example 1 having a length of 25 cm i.d. 7 cm was employed. The tube was connected to a container with raw beer. Raw beer is a pre-clarified aqueous suspension comprising solid and hazy particles including yeast.

The Zeta potential of raw beer treated in this example was negative at a pH value between 4 and 6.5, which corresponds to the negative Zeta potential of the titania filter membrane at the pH value of the beer.

The raw beer was pumped from a container through the membrane tube, both units were maintained at a temperature of −1° C.

In a first test run the filter membrane according to the invention was compared with a commercially available titania filter membrane (length 250 mm, i.d. 7 mm) supplied by Inorcermic GmbH, Germany. The filter membrane was tested without back-flush.

Raw beer was pumped with an inlet flow of 310 l/h·m² through the Inocermic filter membrane and at 625 l/h·m² through the TiO$_2$ membrane according to the invention prepared as in Example 1.

Results obtained with the above test runs are graphically summarised in FIG. 1. As apparent from FIG. 1, the Inocermic filter membrane was clogged after about 30 sec. with a flow rate through the membrane below 10 l/h·m$^2$.

The TiO$_2$ membrane according to the invention was on stream for 4 hours with a substantially linear decrease of flow through the membrane from 625 l/h·M$^2$ at start of the test run to a flow of 200 l/h·m$^2$.

Figure 2:
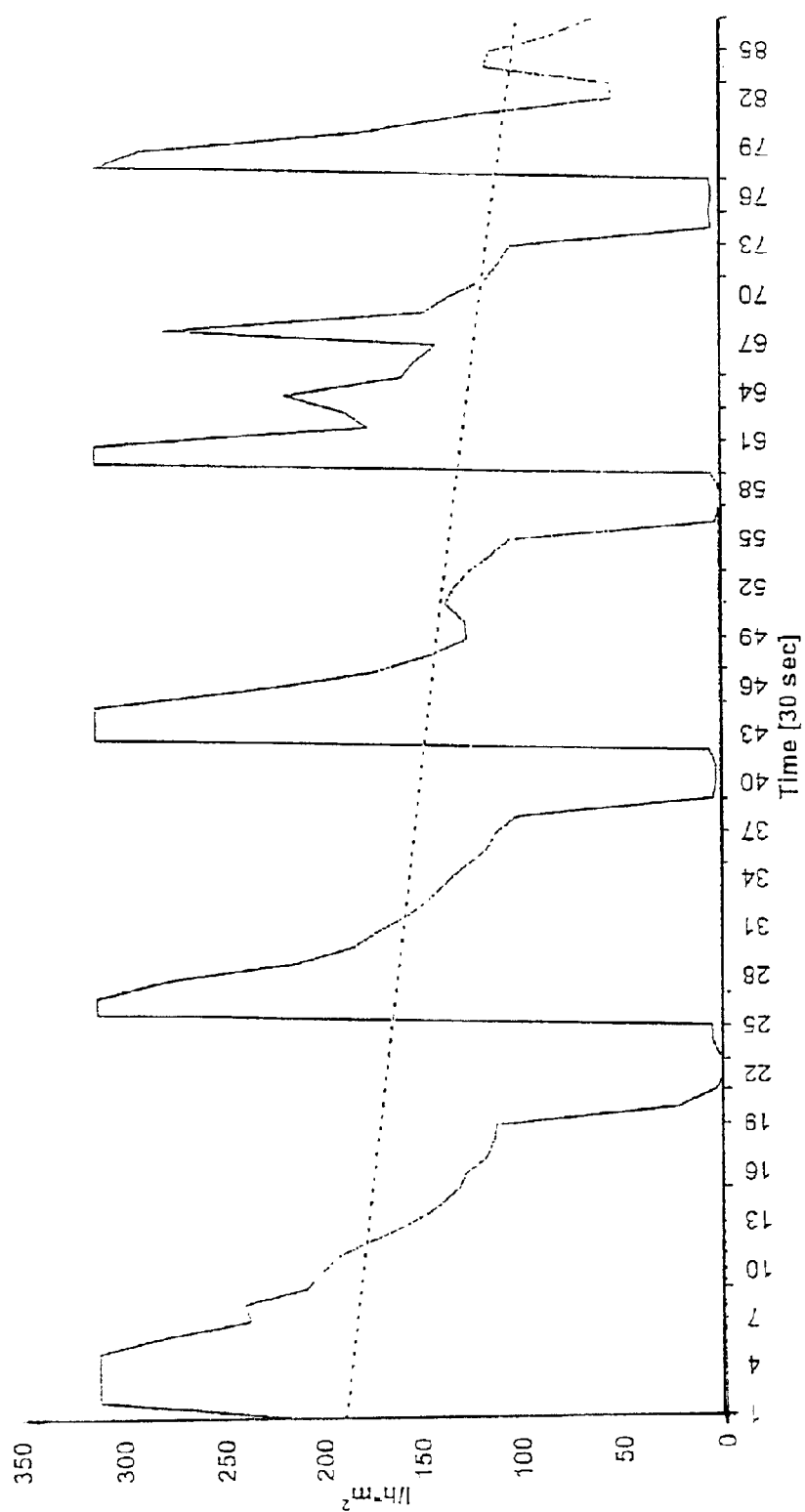

In a second test run, the TiO$_2$ filter membrane according to the invention was operated with back-flush for every 10 min on stream with a back-flush period of 3 minutes. The second test run was initiated with a flow of 315 l/h m$^2$, FIG. 2 shows flow through the filter membrane over a test period of 45 min. As seen from FIG. 2 fouling of the filter membrane is reversibly controlled by back-flushing the membrane periodically. Flow through the membrane was re-established to its initial velocity after each back-flushing period.

What is claimed is:

1. Method for the removal of particulate matter from aqueous suspension comprising the steps of:
    measuring a value of pH of the suspension and determining a polarity of Zeta potential of particles in the suspension at the measured pH value;
    selecting a porous ceramic filter having a membrane layer consisting of at least a metal-oxide with a Zeta potential at the pH value of the suspension having same polarity of the Zeta potential as the particles in the suspension;
    passing the suspension through the porous filter; and
    withdrawing a filtrate.

2. Method according to claim 1, wherein the suspension is passed in cross-flow through the filter.

3. Method according to claim 1, wherein the particles comprise yeast cells.

4. Method according to claim 1, wherein the suspension is selected from beer and wine.

5. Method according to claim 1, wherein the pH of the suspension is about 3–4, the Zeta potential of the particles in the suspension has a positive polarity, and the metal-oxide is TiO$_2$ (anatase).

6. Method according to claim 1, wherein the pH of the suspension is about 4–5, the Zeta potential of the particles in the suspension has a positive polarity, and the metal-oxide is selected from the group consisting of TiO$_2$ (anatase), ZrO$_2$, and Al$_2$O$_3$.

7. Method according to claim 1, wherein the pH of the suspension is about 5–7, the Zeta potential of the particles in the suspension has a positive polarity, and the metal-oxide is selected from the group consisting of ZrO$_2$, Al$_2$O$_3$, and MgAl$_2$O$_4$.

8. Method according to claim 1, wherein the pH of the suspension is about 7–8, the Zeta potential of the particles in the suspension has a positive polarity, and the metal-oxide is selected from the group consisting of ZrO$_2$ and MgAl$_2$O$_4$.

9. Method according to claim 1, wherein the pH of the suspension is about 8–9, the Zeta potential of the particles in the suspension has a positive polarity, and the metal-oxide is MgAl$_2$O$_4$.

10. Method according to claim 1, wherein the pH of the suspension is about 9–10, the Zeta potential of the particles in the suspension has a positive polarity, and the metal-oxide is MgAl$_2$O$_4$ (400° C.).

11. Method according to claim 1, wherein the pH of the suspension is about 3–4, the Zeta potential of the particles in the suspension has a negative polarity, and the metal-oxide is selected from the group consisting of TiO$_2$ (rutil) and WO$_3$.

12. Method according to claim 1, wherein the pH of the suspension is about 4–5, the Zeta potential of the particles in the suspension has a negative polarity, and the metal-oxide is selected from the group consisting of TiO$_2$ (rutil), WO$_3$, and SiO$_2$.

13. Method according to claim 1, wherein the pH of the suspension is about 5–6, the Zeta potential of the particles in the suspension has a negative polarity, and the metal-oxide is selected from the group consisting of TiO$_2$ (rutil) and WO$_3$.

14. Method according to claim 1, wherein the pH of the suspension is about 6–8, the Zeta potential of the particles in the suspension has a negative polarity, and the metal-oxide is TiO$_2$ (anatase).

15. A system for cross-flow microfiltration, comprising:
    an aqueous suspension of particles to be retained, said particles having a sign of polarity and said aqueous suspension having a pH value;
    a porous ceramic filter having a membrane layer consisting of a least one metal-oxide, said membrane layer being selected to have a Zeta potential with the same sign of polarity as the particles at the pH value of the aqueous suspension during filtration; and
    a pump for pumping the aqueous suspension through the porous ceramic filter.

* * * * *